United States Patent

Bundo et al.

Patent Number: 5,429,878
Date of Patent: Jul. 4, 1995

[54] METAL CORDS FOR RUBBER REINFORCEMENT AND TIRES USING THE SAME

[75] Inventors: Motonori Bundo, Higashimurayama; Kazuma Morotomi, Kodaira, both of Japan

[73] Assignee: Bridgestone Corporation, Tokyo, Japan

[21] Appl. No.: 116,568

[22] Filed: Sep. 7, 1993

Related U.S. Application Data

[62] Division of Ser. No. 845,131, Mar. 3, 1992, Pat. No. 5,295,346.

[30] Foreign Application Priority Data

Mar. 6, 1991 [JP] Japan .................. 3-65540

[51] Int. Cl.$^6$ .................. B60C 9/00
[52] U.S. Cl. .................. 428/592; 152/451
[58] Field of Search .................. 57/200, 236, 241, 242, 57/311, 902; 428/592, 606; 152/451

[56] References Cited

U.S. PATENT DOCUMENTS

| 4,333,306 | 6/1982 | Yamashita et al. | 57/902 |
| 4,438,796 | 3/1984 | Abe et al. | 152/451 |
| 4,715,419 | 12/1987 | Kawasaki et al. | 57/902 |
| 4,749,017 | 6/1988 | Loesch | 57/902 |
| 4,836,262 | 6/1989 | Nishizawa et al. | 152/451 |
| 4,938,015 | 7/1990 | Kinoshita | 57/200 |
| 5,162,067 | 11/1992 | Miyawaki | 57/902 |
| 5,213,652 | 2/1993 | Katoh et al. | 57/902 |
| 5,293,737 | 3/1994 | Kobayashi et al. | 152/451 |

FOREIGN PATENT DOCUMENTS

| 0225055 | 6/1987 | European Pat. Off. . |
| 0237462 | 9/1987 | European Pat. Off. . |
| 0385666 | 9/1990 | European Pat. Off. . |
| 0417694 | 3/1991 | European Pat. Off. . |
| 198101 | 12/1982 | Japan . |
| 1229704 | 9/1989 | Japan . |
| 1-250482 | 10/1989 | Japan | 57/902 |
| 4-281081 | 10/1992 | Japan | 57/236 |
| 5-125674 | 5/1993 | Japan | 57/902 |
| 5-195360 | 8/1993 | Japan | 57/902 |
| 225477 | 12/1924 | United Kingdom . |

*Primary Examiner*—John Zimmerman
*Attorney, Agent, or Firm*—Sughrue, Mion, Zinn, Macpeak & Seas

[57] ABSTRACT

A metal cord usable for the reinforcement of rubber articles is comprised of a helically formed single wire filament having a twisting angle of 75–84.5° or a bundle of two twisted metal filaments each having a twisting angle of 75–84.5°. Such metal cords are preferably used as a rubber reinforcement in each part of a pneumatic tire.

4 Claims, 3 Drawing Sheets

FIG_1
FIG_2
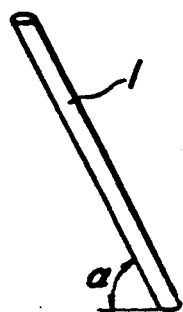
FIG_3

FIG_4
PRIOR ART
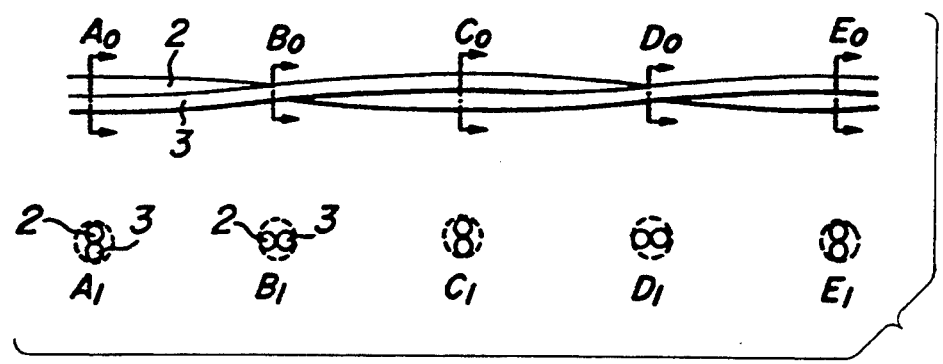
FIG_5
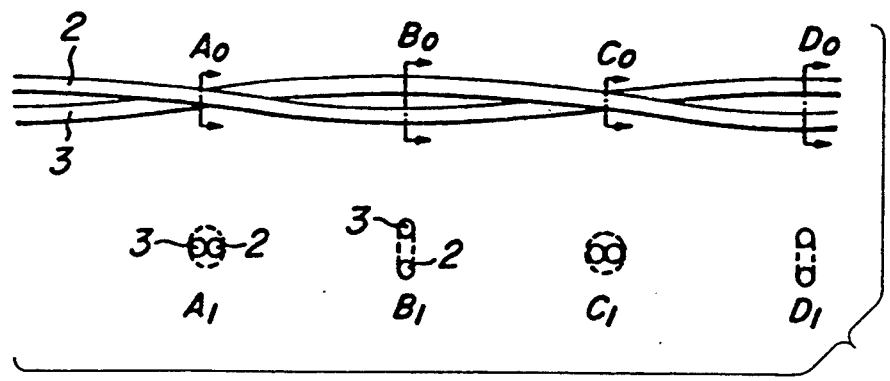

METAL CORDS FOR RUBBER REINFORCEMENT AND TIRES USING THE SAME

This is a divisional of application Ser. No. 07/845,131 filed Mar. 3, 1992, now U.S. Pat. No. 5,295,346.

BACKGROUND OF THE INVENTION

1. Field of the Invention

This invention relates to a metal cord having a novel twisting structure used as a rubber reinforcing material in tires for a vehicle, a conveyor belt and the like as well as a pneumatic tire using such metal cords as a reinforcing material.

2. Disclosure of the Related Art

In the art, steel cords of so-called 1×4 or 1×5 twisting structure comprised of 4–5 filaments are widely used as a rubber reinforcement for a tire or the like. Recently, the use of steel cords having 1×2 twisting structure has started for attaining the weight reduction, low fuel consumption and low cost of the tires for vehicles, and also the use of single wire cord comprised of only wire filament is proposed.

However, when the cord of the twisting structure simplified by merely reducing the number of filaments such as 1×2 twisting structure, single wire cord or the like is used in the belt of the tire, if the excessive force is given in cornering, a so-called buckling deformation is caused in the ground contacting portion outside the belt. Hence the cord breakage is caused due to the deformation input. Therefore, there is adopted a procedure of adding a new reinforcing material to the edge portion of the belt in the building of the tire.

Since the use of such a new reinforcing material is contrary the purpose for attaining the weight reduction, low fuel consumption and the like of the tire, it largely decreases the merit of using steel cord of 1×2 twisting structure or single wire cord as a rubber reinforcement.

The steel cord of 1×2 twisting structure is proposed in Japanese Patent laid open No. 62-117893 and No. 62-234921.

However, such steel cords are very poor in the breaking property because the angle of steel filament itself too rises with respect to the longitudinal direction of the cord. Consequently, they are not used in the belt portion of the tire as they are.

Also, Japanese Patent laid open No. 2-229286 proposes steel cords of 1×2 twisting structure, in which forming ratios of two filaments are changed to periodically and alternately create portions of contacting the filaments with each other and portions of causing no filament contact (portion surrounded by rubber) in the longitudinal direction of the cord.

In the later article, it is described that when the steel cord formed by changing the forming ratios of the filaments is applied to the belt portion of the tire, it prevents penetration of water invaded from cut failure on the tread surface into the steel cord of the belt layer in the longitudinal direction of the cord. Thus, the cord breakage due to the occurrence of rust can be prevented.

In the steel cord of 1×2 twisting structure, however, it is not necessarily required to alternately create the filament contacting portions and the non-contact portions as described the above article because the steel cord of 1×2 twisting structure does not produce cord breakage and the like due to the occurrence of rust through penetration of water. Moreover, it is substantially impossible to embed such steel cords in rubber for the tire while alternately holding the contacting portions and the noncontact portions in the cord. Even if these cords are embedded in the rubber at such a state that the contacting portions and the noncontact portions are alternately existent in the longitudinal direction of the cord, the angle of the filament itself with respect to the longitudinal direction of the cord at the contacting portion is too large, so that the cord breakage may be caused.

On the other hand, the single wire cord is described in Japanese Patent laid open No. 57-198101 and No. 1-229704, which is a simple straight wire cord, so that the resistance to cord breakage is very poor unless a reinforcing member such as a layer material or the like is used.

SUMMARY OF THE INVENTION

It is, therefore, an object of the invention to improve the resistance to cord breakage in the metal cord of 1×2 twisting structure or single wire without using the other reinforcing member for attaining the weight reduction, low fuel consumption and low cost of the rubber articles.

The inventors have made various studies in order to solve the problems of the conventional metal cord of 1×2 twisting structure or single wire and found that the resistance to cord breakage is improved by adopting the following structure.

That is, a first aspect of the invention lies in a metal cord formed by twisting two metal filaments at the same pitch, characterized in that a twisting angle $\alpha_1$ is represented by an equation (1) of $75° \leq \alpha_1 \leq 84.5°$ and the filaments are contacted with each other at two positions per one twisting pitch.

In this case, each of these filaments has a filament diameter of 0.15–0.8 mm, preferably 0.20–0.6 mm.

A second aspect of the invention lies in a metal cord comprised of a helically formed single wire, in which a twisting angle $\alpha_M$ is represented by an equation (2) of $75° \leq \alpha_M \leq 84.5°$.

In this case, the single wire has a filament diameter of 0.20–1.2 mm, preferably 0.25–1.0 mm.

According to a third aspect of the invention, there is the provision of a pneumatic tire comprising a carcass, a belt and a chafer as a tire skeleton member, characterized in that the metal cord defined in the above first and second aspects of the invention is used in at least one of these skeleton members.

According to the invention, it has been found that the resistance to cord breakage is improved by using the metal cord defined in the first and second aspects as a rubber reinforcement, and that when these cords are applied to the tire, the weight reduction, low fuel consumption and low cost of the tire can be attained.

The term "twisting angle" used herein means a complement of an angle of a metal filament with respect to the longitudinal direction of the cord. Considering a case that the cord is true circle, the twisting angle is shown in FIG. 1, which can be considered as an extended cord shown in FIG. 2. In these drawings, numeral 1 is a metal filament, letter P a twisting pitch, letter R a cord diameter, letter d a filament diameter, and letter $R_0$ a cord radius ($R_0 = R/2 - d/2$).

The twisting angle is shown by a letter $\alpha$ and has the following relation:

$$\alpha = \tan^{-1} P/\pi(R-d)$$

which is determined by a twisting pitch or forming pitch P, filament diameter d and cord diameter R from the following relation:

$$\tan \alpha = P/2\pi R_0 = P/\pi(R-d)$$

Thus, the twisting angle is theoretically determined by the cord diameter, pitch (twisting pitch in case of 1×2 structure, forming pitch in case of single wire) and filament diameter, and can actually be measured from the shape of the filament 1 itself as shown in FIG. 3.

In case that the shape of the cord is ellipsoidal, it is particularly preferable to actually measure the twisting angle, in which an average value is adopted by measuring at 10 positions in the longitudinal direction of the cord.

According to the invention, the section of the cord develops the desired effect even in the circular shape and the ellipsoidal shape. When the ellipsoidal cords are embedded in the belt layer of the tire, it is desirable to measure an angle of the filament with respect to the longitudinal direction of the cord from the tread surface. Moreover, in the ellipsoidal cord, the ratio of major axis a to minor axis b is not particularly limited, but the ratio a/b is preferably within a range of $1 \leq a/b \leq 2$ in view of the prevention of cord breakage.

BRIEF DESCRIPTION OF THE DRAWINGS

The invention will be described with reference to the accompanying drawings, wherein:

FIG. 1 is a schematic view showing a part of a metal filament in the longitudinal direction of the metal cord;

FIG. 2 is a schematic view showing an extended state of the metal filament;

FIG. 3 is a schematic view of a part of the metal cord;

FIG. 4 is a schematic view showing a part of the conventional steel cord of 1×2 twisting structure and sections thereof at various positions in the longitudinal direction;

FIG. 5 is a schematic view showing a part of steel cord of 1×2 twisting structure according to the first aspect of the invention and sections thereof at various positions in the longitudinal direction.

DESCRIPTION OF THE PREFERRED EMBODIMENTS

In the metal cord according to the first aspect of the invention, as shown in FIG. 5, the twisting angle of the filament with respect to the longitudinal direction of the cord is considerably large as compared with that of the conventional metal cord of 1×2 twisting structure shown in FIG. 4. When the metal cords according to the invention are used, for example, in a belt layer of a tire, if bending input such as buckling deformation or the like is applied to the belt layer, these cords act to mitigate strain at the surface of the filament, whereby the cord breakage can be avoided.

Figure 6:
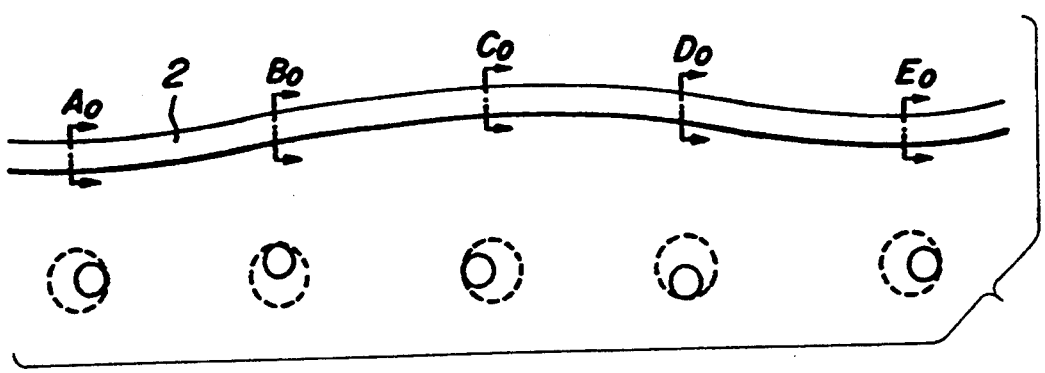
FIGS. 6 and 7 are schematic views of embodiments showing a part of single wire cord according to the second aspect of the invention and sections at various positions in the longitudinal direction, respectively.
Figure 7:
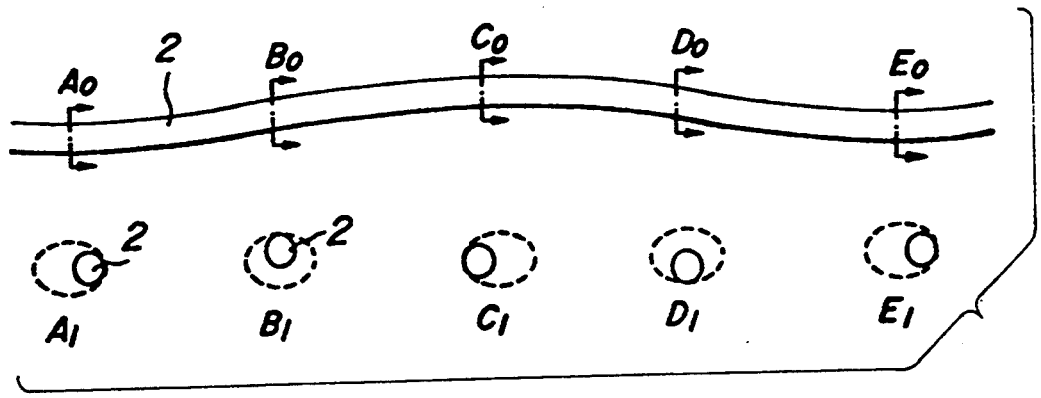

In the metal cord according to the second aspect of the invention, an adequate angle of the filament with respect to the longitudinal direction of the cord is held as shown in FIG. 6, so that cord breakage can be prevented. Moreover, when the metal cord according to the second aspect of the invention is subjected to forming as shown in FIG. 7, the resistance to cord breakage is considerably improved as compared with the conventional single straight cord.

In FIGS. 4 to 7, numerals 2 and 3 are metal filaments, and sections of the cord ($A_1$, $B_1$, ...) in the longitudinal direction thereof are shown beneath arrow positions ($A_0$, $B_0$, ..., ), respectively.

According to the invention, it has been found that in the metal cord of 1×2 twisting structure or single wire, when the angle of the twisting filament or single wire filament with respect to the longitudinal direction of the cord is not less than 5.5°, the resistance of cord breakage is largely improved as mentioned above. However, when the angle is too large, the lowering of the strength of the metal cord itself becomes large and the volume of one metal cord occupied in the belt layer increases to decrease the end count. As a result the angle of the filament to the longitudinal direction of the cord is favorably not more than 15° for holding the strength of the belt itself in the tire.

Particularly, when the metal cord is used in the belt layer of the tire, it is preferable that the angle of the filament with respect to the longitudinal direction of the cord is within a range of 7.5°–10° from a viewpoint of the resistance to cord breakage and the strength of the belt itself.

The metal cords of 1×2 twisting structure according to the first aspect of the invention are produced by forming each of metal filaments at a given forming ratio through a preformer before the twisting and then twisting two of these formed filaments, or by continuously twisting two filaments with each other in the longitudinal direction and then forming a bundle of these twisted filaments at a given forming ratio through a preformer.

Similarly, the metal cords of single wire filament according to the second aspect of the invention are easily produced by forming the filament at a given forming ratio through the preformer.

Moreover, these metal cords may be shaped into an ellipsoidal cord by subjecting the cord to flat working through pushing rolls or the like.

The following examples are given in illustration of the invention and are not intended as limitations thereof.

In this example, the metal (steel) cords according to the invention are applied to a belt of a pneumatic tire for passenger car.

The tire to be tested has a tire size of 175/70 R13 and comprises two steel belt layers having a cord angle of 68° with respect to an equatorial plane of the tire, in which a first belt layer has a width of 140 mm and a second belt layer has a width of 130 mm.

After the test tire was inflated under an internal pressure of 1.7 kgf/cm$^2$ and run on a general road over a distance of 40,000 km, it was cut to measure the number of broken positions in the steel cord at the belt layer.

The measured results are shown in Table 1.

TABLE 1

|  | Comparative Example 1 | Comparative Example 2 | Example 1 | Example 2 | Comparative Example 3 | Example 3 | Example 4 |
| --- | --- | --- | --- | --- | --- | --- | --- |
| Twisting structure of cord | 1 × 4 × 0.25 | 1 × 2 × 0.30 | 1 × 2 × 0.30 | 1 × 2 × 0.30 | 1 × 2 × 0.30 | 1 × 1 × 0.50 | 1 × 1 × 0.50 |
| Twisting angle | 84.7 | 86.2 | 82.5 | 80.0 | 74.0 | 82.5 | 82.5 |
| Cord pitch | 14 | 14 | 14 | 14 | 14 | 8 | 8 |
| End count (cords/50 mm) | 40.2 | 45.7 | 45.7 | 40.0 | 25.0 | 46.5 | 45.6 |
| Sectional shape |  | FIG. 4 (conventional type) | FIG. 5 | FIG. 5 | FIG. 5 | FIG. 6 | FIG. 7 (a/b = 1.4) |
| Number of broken positions in cord | 55 | 80 | 20 | 25 | 52 | 26 | 22 |

As seen from Table 1, the occurrence of steel cord breakage in the steel cords according to the invention (Examples 1–4) is reduced to a half or less of that in the conventional steel cord of 1×4 twisting structure (Comparative Example 1). Even in the steel cords of 1×2 twisting structure, when the twisting angle is more than 84.5° (Comparative Example 2) or less than 75° (Comparative Example 3), the breakage of the steel cord is equal to or more than that of Comparative Example 1. When the twisting angle is restricted according to the invention (Examples 1–3), the occurrence of steel cord breakage is considerably reduced, so that the restriction of the twisting angle according to the invention develops a great effect. Furthermore, the occurrence of cord breakage is considerably reduced even in the metal cords of single wire filament (Examples 3 and 4).

As mentioned above, according to the invention, the twisting angle of the filament in the metal cord is restricted to a particular angle range, whereby the resistance to cord breakage can considerably be improved.

Further, when such metal cords are used, for example, in each constituting part of the tire, the weight reduction and low fuel consumption and low cost of the tire can be attained. Therefore, the metal cords according to the invention may be widely used as a cord for rubber articles.

What is claimed is:

1. A metal wire comprised of a helically formed single wire, in which a twisting angle $\alpha_M$ is represented by $75° \leq \alpha_m \leq 84.5°$.

2. The metal wire according to claim 1, wherein said wire has a filament diameter of 0.20–1.2 mm.

3. The metal wire according to claim 2, wherein said filament diameter is 0.25–1.0 mm.

4. A pneumatic tire comprising a carcass, a belt and a chafer as a tire skeleton members, and wherein a metal wire comprising a helically formed single wire, in which a twisting angle $\alpha_M$ is represented by $75° \leq \alpha_M \leq 84.5°$ is used in at least one of said skeleton members.

* * * * *